Patented Apr. 25, 1950

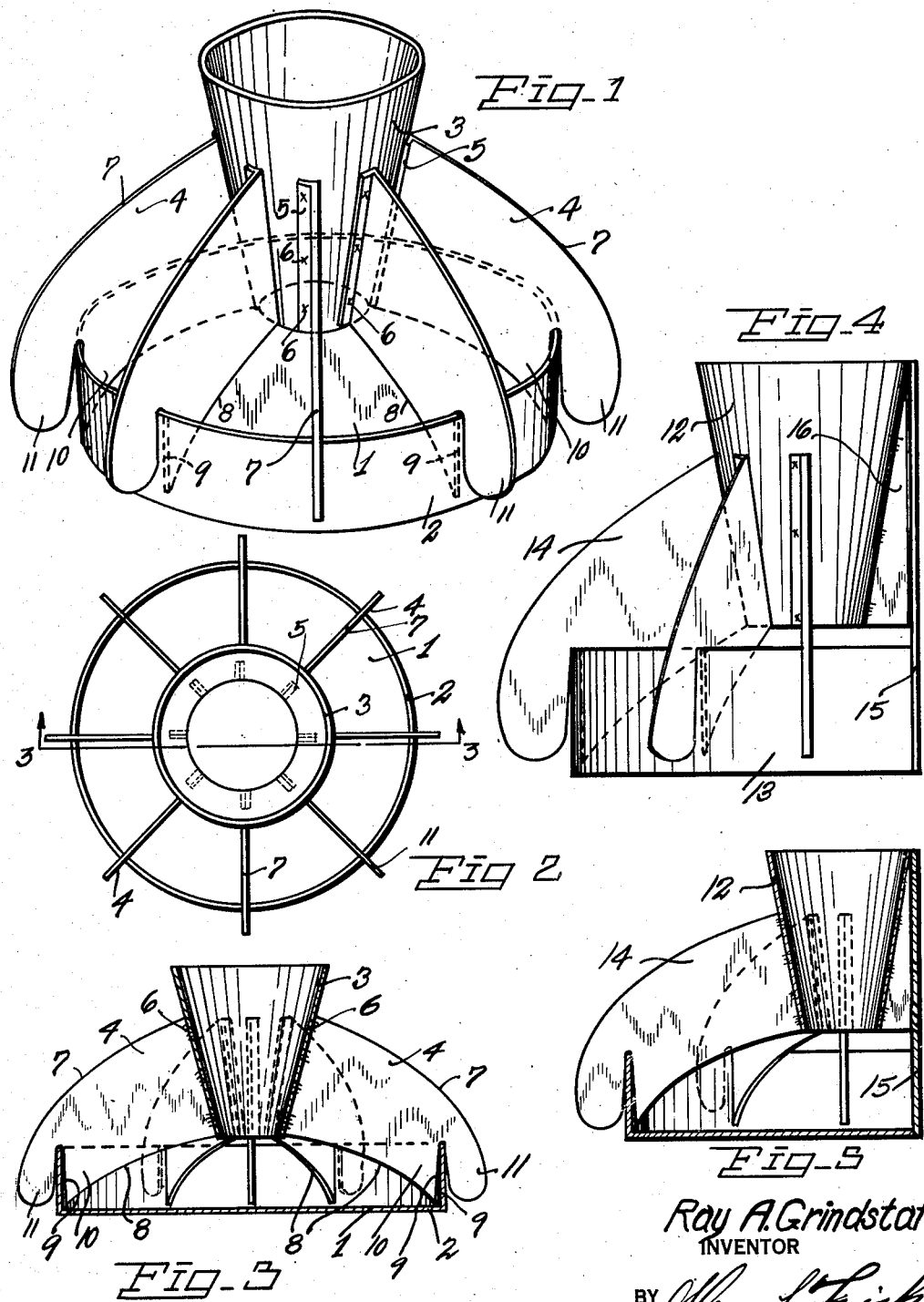

2,505,396

UNITED STATES PATENT OFFICE 2,505,396

RABBIT FEEDER

Ray A. Grindstaff, Spokane, Wash.

Application September 23, 1946, Serial No. 698,847

1 Claim. (Cl. 119—52)

This invention relates to a feeder which is particularly intended for feeding rabbits but is not restricted to this use.

One object of the invention is to provide a feeder so constructed that feed may be poured into a hopper from which it flows into a pan over which the hopper is supported and thus provide the rabbits with a supply of feed which will be delivered to the pan as food is consumed.

Another object of the invention is to provide a feeder wherein the hopper is supported over the pan centrally thereof by plates which not only serve as supports for the hopper but also constitute partitions which divide the pan into a number of feeding compartments and prevent rabbits from interfering with each other while feeding.

Another object of the invention is to so form and so arrange the partitioning plates that they extend radially from the hopper to which they are firmly secured and have their outer ends formed with slots into which the marginal wall of the pan is fitted. It will thus be seen that the hopper will be firmly supported over the pan and that by drawing the hopper upwardly the partitions or plates will be drawn upwardly with it and disconnected from the pan so that the feeder may be thoroughly cleaned when necessary.

Another object of the invention is to provide a feeder so constructed that while rabbits may conveniently feed from the feeder they will be prevented from stepping into the pan and also prevented from scattering the feed out of the pan.

The invention is illustrated in the accompanying drawings wherein:

Fig. 1 is a perspective view of the improved feeder.

Fig. 2 is a top plan view of the feeder.

Fig. 3 is a vertical sectional view taken diametrically through the feeder along line 3—3 of Figure 2.

Fig. 4 is a side view of a feeder of modified construction.

Fig. 5 is a sectional view taken vertically through the modified form of feeder.

The improved rabbit feeder constituting the subject matter of this invention has a base or pan 1 which may be formed of sheet metal or other suitable material and is of circular outline, the wall 2 of the pan being of sufficient height to allow the pan to hold a quantity of grain or rolled oats, or prepared food, and allow the rabbits to easily feed from the pan. Over the pan is disposed a funnel shaped hopper 3, which is also formed of sheet metal, and is supported centrally of the pan by plates 4 formed of sheet metal. These plates not only serve as supports for the hopper but also constitute partitions which divide the space about the hopper into stalls and allow rabbits to have individual feeding stalls from which they may feed without interference by other rabbits feeding from the pan. The plates or partitions have their inner ends bent to form flanges 5 which are spot welded to the hopper, as shown at 6, and upon referring to Figure 3 it will be seen that the partitions each have arcuate upper and lower edges 7 and 8 which are so curved that the partitions extend radially from the hopper at a downward incline.

Slots 9, which taper upwardly, lead from lower edges of the partitions near their outer ends to receive the wall of the pan and removably mount the hopper over the pan. The inner edges of the slots are cut straight so that when the plates are applied to the pan downwardly tapered portions 10 of the plates will rest upon the bottom of the pan close to the wall thereof. The portions of the plates between the slots and outer ends of the plates form fingers 11 which have semicircular lower ends and are foreshortened with respect to the portions 10 so that when the plates are applied to the pan lower ends of the fingers will be spaced upwardly from the surface of the ground or floor of a pen and the plates prevented from being shifted upwardly by contact with the ground and loosened. Therefore the plates will have gripping engagement with the wall of the pan and will be firmly held against dislodging movement.

When this feeder is in use it is placed in a pan with the hopper supported over the pan and the pan and the hopper filled with free running feed. The rabbits gather about the feeder and eat from the pan and since each rabbit feeds from space between two of the plates or partitions they will be prevented from interfering with each other. The feeding spaces between the plates or partitions taper inwardly, as shown in Figure 2, and are of only sufficient width for a rabbit to thrust its head between the plates while eating. Therefore a rabbit cannot step into the pan and mess or scatter the feed. As feed is consumed from the pan, feed in the hopper will flow by gravity from the hopper into the pan. The hopper may be of increased height and diameter so that it will hold a larger quantity of feed and it will also be understood that if so desired a supplementary container having a tapered lower portion or a spout at its lower end may be supported in upright position in the hopper and grain allowed to flow from the supplementary container into the hopper to replenish the supply and thus provide a larger supply of feed for the rabbits.

In Figures 4 and 5 there has been shown a feeder of modified construction. This feeder has a hopper 12 which corresponds to the hopper 3 and is supported over a pan 13 by plates 14 corresponding to the plates 4. It should be noted, however, that the pan is semicircular instead of circular and has a flat rear wall 15 which projects upwardly to a height disposing its upper end flush with the top of the hopper. A web 16 of triangular shape is welded to the hopper at the rear thereof and this hopper has its rear edge straight cut so that it fits flat against the front face of the upwardly projecting portion of the rear wall 15. The web serves to brace the hopper against rearward tilting but is free from the rear wall so that when the hopper is grasped and upward pull exerted the hopper and the plates or partitions 14 may be withdrawn from the pan. Since the hopper and its plates may be removed from the pan, the feeder may be thoroughly cleaned when necessary.

Having thus described the invention, what is claimed is:

A feeder comprising a pan constituting a base, a downwardly tapered hopper over the center of the pan, open at upper and lower ends, plates carried by said hopper and projecting radially therefrom and spaced from each other circumferentially of the hopper, said plates having arcuate upper and lower edges and extending outwardly at a downward incline from the hopper, outer end portions of the plates being formed with vertical slots leading from their lower edges and tapered upwardly, and defining fingers disposed outwardly of the pan and having arcuate lower edges merging into their inner and outer side edges, the wall of the pan being guided into the slots of the plates by the arcuate lower edges with fingers and having wedging fit therein to hold the plates in place upon the pan, said plates supporting the hopper over the pan centrally thereof and constituting partitions dividing the pan into feeding spaces about the hopper, the plates having their lower edges spaced upwardly from the bottom of the pan for flow of feed under the plates, and the portions of the plates between the slots and outer end of the plates forming the fingers being of less depth than the wall of the pan whereby they will be prevented from making contact with a surface upon which the pan rests and dislodging the plates from the pan.

RAY A. GRINDSTAFF.

REFERENCES CITED

The following references are of record in the file of this patent:

UNITED STATES PATENTS

| Number | Name | Date |
| --- | --- | --- |
| 325,690 | Nelson et al. | Sept. 8, 1885 |
| 410,563 | Seward | Sept. 3, 1889 |
| 1,005,071 | Randall | Oct. 3, 1911 |
| 1,282,092 | Lieber | Oct. 22, 1918 |
| 2,309,896 | Gustafson et al. | Feb. 2, 1943 |